United States Patent
Yasovsky et al.

(10) Patent No.: US 11,054,664 B2
(45) Date of Patent: Jul. 6, 2021

(54) MONITORING DOE PERFORMANCE USING SOFTWARE SCENE EVALUATION

(71) Applicant: APPLE INC., Cupertino, CA (US)

(72) Inventors: Alon Yasovsky, Rehovot (IL); Ronen Deitch, Modiin (IL); Yohai Zmora, Ganey-Tikva (IL)

(73) Assignee: APPLE INC., Cupertino, CA (US)

( * ) Notice: Subject to any disclaimer, the term of this patent is extended or adjusted under 35 U.S.C. 154(b) by 1340 days.

(21) Appl. No.: 14/742,816

(22) Filed: Jun. 18, 2015

(65) Prior Publication Data

US 2016/0371845 A1    Dec. 22, 2016

(51) Int. Cl.
*H04N 7/18* (2006.01)
*G02B 27/42* (2006.01)
*G06K 9/00* (2006.01)

(52) U.S. Cl.
CPC ..... *G02B 27/4205* (2013.01); *G06K 9/00335* (2013.01)

(58) Field of Classification Search
CPC .............. G06T 7/0065; G02B 27/4205; G06K 9/00335
USPC ....... 348/136, 47, 50, 46; 345/419; 382/203; 250/201.1; 356/610, 4.07, 51
See application file for complete search history.

(56) References Cited

U.S. PATENT DOCUMENTS

| | | | |
|---|---|---|---|
| 8,330,134 B2 * | 12/2012 | Yee | G01J 1/02 250/201.1 |
| 8,400,494 B2 | 3/2013 | Zalevsky et al. | |
| 8,456,517 B2 | 6/2013 | Spektor et al. | |
| 8,492,696 B2 | 7/2013 | Akerman et al. | |
| 2009/0185274 A1 | 7/2009 | Shpunt | |
| 2010/0074532 A1* | 3/2010 | Gordon | G01B 11/25 382/203 |
| 2010/0284082 A1 | 11/2010 | Shpunt et al. | |
| 2011/0310376 A1* | 12/2011 | Shim | G01S 7/497 356/4.07 |
| 2012/0038934 A1* | 2/2012 | Miyasaka | G02B 5/1861 356/610 |
| 2013/0107021 A1* | 5/2013 | Maizels | G06T 19/006 348/50 |
| 2013/0215235 A1* | 8/2013 | Russell | G03B 35/00 348/47 |
| 2014/0002445 A1* | 1/2014 | Xiong | H04N 13/271 345/419 |
| 2014/0307055 A1* | 10/2014 | Kang | H04N 5/33 348/47 |
| 2015/0116460 A1* | 4/2015 | Jouet | H04N 13/0271 348/46 |

* cited by examiner

*Primary Examiner* — Jayanti K Patel
*Assistant Examiner* — Richard B Carter
(74) *Attorney, Agent, or Firm* — Kligler & Associates Patent Attorneys Ltd

(57) ABSTRACT

A method for projection includes projecting a pattern of structured light with a given average intensity onto a scene. A sequence of images is captured of the scene while projecting the pattern. At least one captured image in the sequence is processed in order to extract a depth map of the scene. A condition is identified in the depth map indicative of a fault in projection of the pattern. Responsively to the identified condition, the average intensity of the projection of the pattern is reduced.

20 Claims, 4 Drawing Sheets

MONITORING DOE PERFORMANCE USING SOFTWARE SCENE EVALUATION

FIELD OF THE INVENTION

The present invention relates generally to pattern projection, and specifically to monitoring the performance of pattern projectors.

BACKGROUND

Diffractive optics are used in a wide variety of applications. In some applications, diffractive optical elements (DOEs) are used in projecting a desired pattern, for purposes such as optical three-dimensional (3D) mapping, area illumination, and LCD backlighting. DOE-based projector designs are described, for example, in U.S. Patent Application Publication 2009/0185274, whose disclosure is incorporated herein by reference.

The "efficiency" of a DOE is a measure of the amount of input energy that the DOE diffracts, in relation to the energy of the incoming beam. This efficiency can vary in production due to manufacturing tolerances. It can also change during the lifetime and operation of the DOE for various reasons. For example, humidity and other vapors can condense on the DOE surface and lower its efficiency, or excess heat, due to a malfunction or misuse, can deform the DOE and change its efficiency. Such changes in efficiency can result in undesirable increases in the intensity of the zero diffraction order, which is not diffracted by the projection optics and may thus continue straight through the DOE to the projection volume.

U.S. Pat. No. 8,492,696, whose disclosure is incorporated herein by reference, describes a DOE-based projector with a built-in beam monitor, in the form of an integral optical detector. The detector signal can be continuously or intermittently monitored by a controller in order to evaluate the DOE efficiency and inhibit operation of the projector if the signal is outside a certain safe range. Such embodiments are said to prevent eye safety hazards that could otherwise arise due to DOE efficiency degradation over the lifetime of the projector.

SUMMARY

Embodiments of the present invention that are described hereinbelow provide improved methods and devices for monitoring the performance of a pattern projector.

There is therefore provided, in accordance with an embodiment of the invention, a method for projection, which includes projecting a pattern of structured light with a given average intensity onto a scene. A sequence of images of the scene is captured while projecting the pattern. At least one captured image in the sequence is processed in order to extract a depth map of the scene, the depth map including an array of pixels with respective depth values. In the depth map, a condition indicative of a fault in projection of the pattern is identified. Responsively to the identified condition, the average intensity of the projection of the pattern is reduced.

In a disclosed embodiment, projecting the pattern includes generating the pattern by directing a laser beam to impinge on a diffractive optical element (DOE), and wherein identifying the condition includes detecting a failure of the DOE.

Typically, identifying the condition includes detecting that a number of the pixels having valid depth values is below a predefined limit. Additionally or alternatively, identifying the condition includes detecting that a distribution of the depth values does not satisfy a predefined validity criterion. Further additionally or alternatively, processing the at least one captured image includes computing confidence scores with respect to the depth values, and identifying the condition includes detecting that a distribution of the confidence scores does not satisfy a predefined validity criterion.

In some embodiments, the at least one image captured while projecting the pattern with the given average intensity is a first image, and the depth map extracted therefrom is a first depth map, and the method includes, after identifying the condition indicative of the fault, capturing at least a second image while projecting the pattern at the reduced average intensity, processing at least the second image in order to extract a second depth map, making a determination, based on the second depth map, that the condition indicative of the fault has been resolved, and responsively to the determination, increasing the average intensity of the projection of the pattern. In a disclosed embodiment, reducing the average intensity includes reducing a duty cycle of the projection of the pattern, and increasing the intensity includes increasing the duty cycle.

Additionally or alternatively, processing at least the second image includes extracting multiple depth maps from successive images captured while projecting the pattern at the reduced average intensity, and making the determination includes deciding that the condition indicative of the fault has been resolved only after finding the condition to have been resolved in a predefined number of the extracted depth maps.

There is also provided, in accordance with an embodiment of the invention, projection apparatus, including a projection assembly, which is configured to project a pattern of structured light with a given average intensity onto a scene. An image capture assembly is configured to capture a sequence of images of the scene while the pattern is projected onto the scene. A processor is configured to process at least one captured image in the sequence in order to extract a depth map of the scene, the depth map including an array of pixels with respective depth values, to identify in the depth map a condition indicative of a fault in projection of the pattern, and responsively to the identified condition, to cause the projection assembly to reduce the average intensity of the projection of the pattern.

There is additionally provided, in accordance with an embodiment of the invention, a computer software product, including a non-transitory, computer-readable medium in which program instructions are stored, which instructions, when read by a programmable processor, cause the processor to receive a sequence of images of a scene while a pattern of structured light is projected onto the scene with a given average intensity, to process at least one captured image in the sequence in order to extract a depth map of the scene, the depth map including an array of pixels with respective depth values, to identify in the depth map a condition indicative of a fault in projection of the pattern, and responsively to the identified condition, to reduce the average intensity of the projection of the pattern.

The present invention will be more fully understood from the following detailed description of the embodiments thereof, taken together with the drawings in which:

DETAILED DESCRIPTION OF EMBODIMENTS

Figure 1:
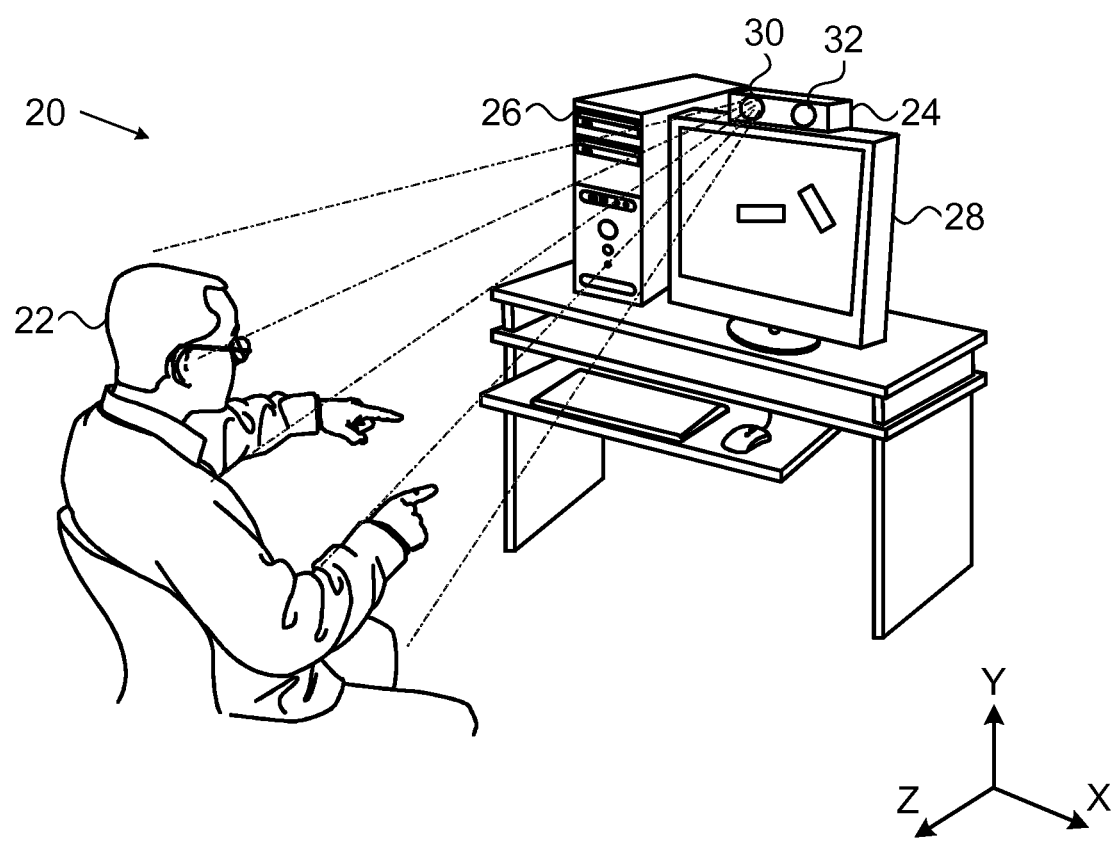
FIG. 1 is a schematic, pictorial illustration of a system for optical 3D mapping, in accordance with an embodiment of the present invention.

Optical projectors based on diffractive optical elements (DOEs) sometimes suffer from the "zero-order problem," which is described in the above-mentioned US 2009/0185274: A portion of the input beam of the projector (the zero diffraction order) may not be diffracted by the projection optics and may thus continue through to the projection volume. Changes in efficiency of a DOE, with concomitant increases in the zero-order intensity, can compromise system performance and may have various other undesirable consequences.

Embodiments of the present invention that are described hereinbelow address the need to detect failures in projectors of structured light in a depth mapping system. The term "structured light," in the context of the present description and in the claims, refers to any and all projected patterns whose deformation, when projected onto a scene, can be analyzed in order to extract a depth map of the scene. Some of the embodiments described herein refer particularly to patterns of spots created by a DOE, but the principles of the present invention may similarly be applied in detecting failures in projection of structured light patterns of other sorts, whether created by a DOE or by other means that are known in the art. The disclosed embodiments take advantage of image processing capabilities that are used in extracting the depth map itself and can thus be implemented at little or no added hardware cost.

In the disclosed embodiments, a projection assembly projects a pattern of structured light onto a scene, and an image capture assembly captures a sequence of images of the scene including the projected pattern. In normal operation, the structured light is projected with a certain average intensity, which is typically chosen so as to give adequate contrast and signal/noise ratio in the captured images without exceeding applicable limits on local intensity at any point within the scene. One or more of the images are processed in order to extract a depth map of the scene. (The term "depth map," as used herein, refers to an array of pixels with respective depth values, and may alternatively be referred to as a 3D map, depth image, or 3D image.) In some embodiments, confidence scores are calculated with respect to the depth values of the pixels, indicating a level of confidence in the calculated depth values. A processor evaluates the depth map, and typically the quality scores, as well, in order to identify conditions that, when they occur, can be indicative of a fault in projection of the pattern. The fault condition may be identified, for example, when the number of pixels in the depth map having valid depth values is below a predefined limit, or when the distribution of the depth values does not satisfy a predefined validity criterion.

When such a fault condition is identified, the average intensity of the projection of the pattern is reduced, thus mitigating deleterious effects that might otherwise arise, for example due to a failure of a DOE in the projection assembly. The depth mapping system does not necessarily shut down, however, but rather, in some embodiments, attempts to determine whether the fault was actually due to a failure in the projection assembly, or whether it was due to a transient disturbance of operating conditions. Such transient disturbances may occur, for example, due to a flash of bright light saturating the image capture assembly or a nearby object blocking the field of view of the projection or image capture assembly. In the latter cases, the depth mapping system should be able to recover from the fault and continue to operate.

For the purpose of such orderly recovery, the image capture assembly continues capturing images while the pattern is projected at the reduced average intensity, and one or more of these images are processed in order to extract further depth maps. If these new depth maps indicate that the fault condition has been resolved, the average intensity of projection of the pattern can be increased back to its previous level, in order to support optimal depth mapping performance. It can be advantageous to reduce the average intensity by reducing the duty cycle of projection of the pattern, so that the pattern is projected only intermittently but at a relatively high instantaneous intensity in order to improve the signal/noise ratio of the images (and thus the extracted depth maps) in this mode of operation. Typically, to enhance safety, operation at full intensity will not be restored immediately after the first depth map extracted in low-intensity mode indicates that the fault condition has been resolved. Rather, full-intensity operation will be restored only after the fault condition is found to have been resolved in a certain predefined number of successive depth maps.

FIG. 1 is a schematic, pictorial illustration of a system 20 for optical 3D mapping, in accordance with an embodiment of the present invention. System 20 comprises an imaging device 24, comprising a projection assembly 30, which generates and projects a pattern onto a scene. In the pictured example, this scene contains an object 22 in the form of a human user of the system, but the scene may, additionally or alternatively, contain other sorts of objects. Details of the design and operation of projection assembly 30 are shown in the figures that follow and are described hereinbelow with reference thereto.

Figure 2:
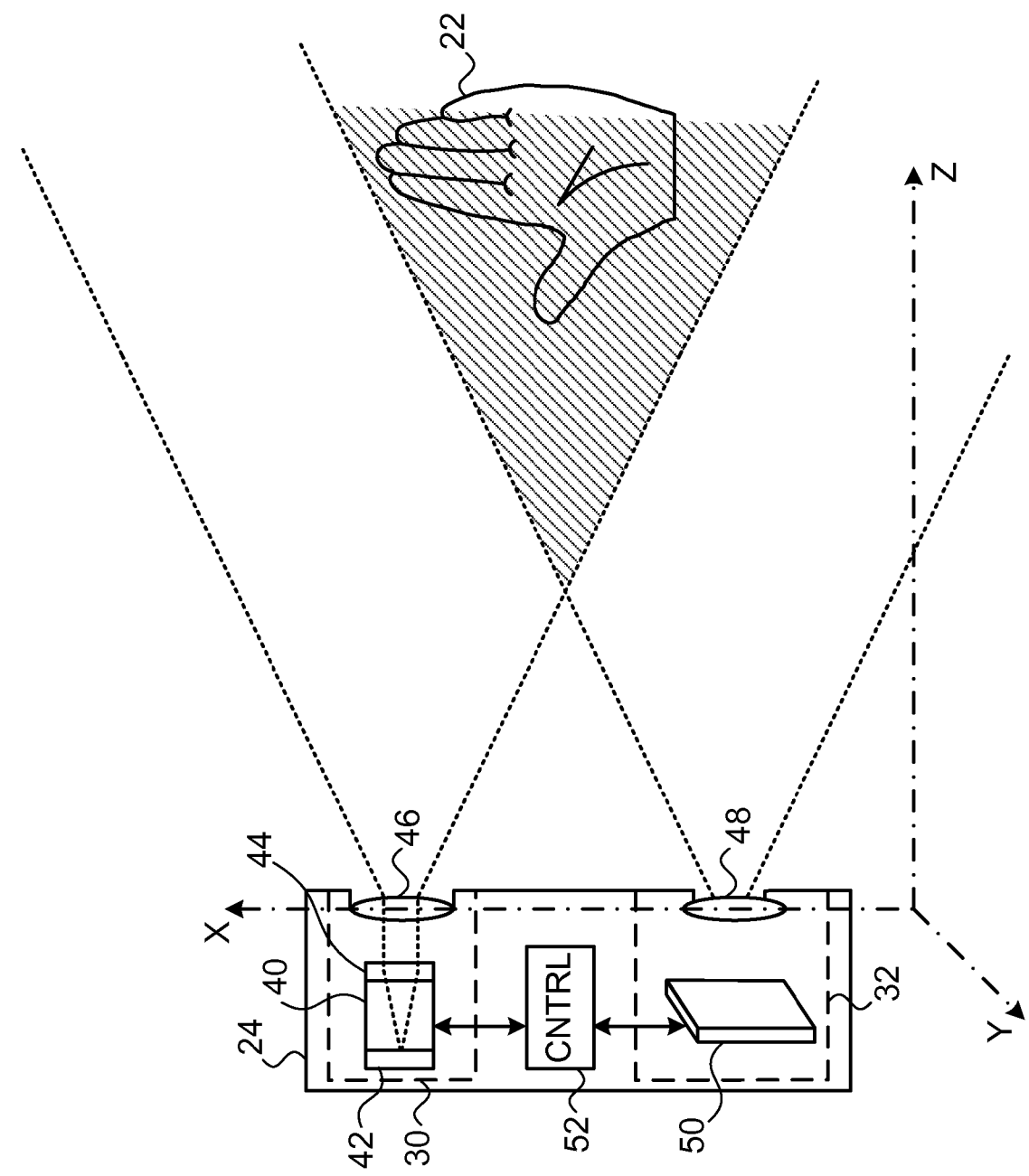
FIG. 2 is a schematic side view of an imaging device, in accordance with an embodiment of the invention.

An image capture assembly 32 in device 24 captures an image of the pattern appearing on the scene. The image data generated by the image capture assembly are processed either internally by a processor within device 24 (as shown in FIG. 2) or by an external image processor 26 in order to reconstruct a depth map of the scene containing object 22. The processor typically computes the 3D coordinates of points on the surface of the object by triangulation, based on the transverse local shifts of the pattern in the captured image relative to a reference pattern at a known distance from device 24, as is known in the art.

Alternatively, the types of monitoring techniques that are described hereinbelow may be used in other sorts of depth mapping systems, not necessarily triangulation-based. More generally, such techniques can be used in substantially any application requiring safe and reliable projection of structured light patterns.

The processor that performs the depth mapping and monitoring techniques that are described herein, whether internal to device 24 or external (such as processor 26), may comprise a general-purpose computer processor, which is programmed in software to carry out the functions described hereinbelow. The software may be downloaded to the processor in electronic form, over a network, for example, or it may alternatively be provided on tangible, non-transitory storage media, such as optical, magnetic, or electronic memory media. Alternatively or additionally, some or all of the functions of the processor may be implemented in dedicated hardware, such as a custom or semi-custom integrated circuit or a programmable digital signal processor (DSP).

The depth map that is generated by system 20 may be used for a wide range of different purposes. For example, the map may be used to provide a gesture-based user interface, in which movements by user 22 are detected by means of device 24 and thus control an interactive computer application, such as a game, and interact with objects shown on a display 28. Alternatively, system 20 may be used to create depth maps of objects of other types, for substantially any application in which 3D coordinate profiles are needed.

FIG. 2 is a schematic side view showing details of imaging device 24, in accordance with an embodiment of the present invention. A set of X-Y-Z axes is used in this figure and throughout the present description to aid in understanding the orientation of the figures, wherein the X-Y plane is the frontal plane of device 24, and the Z-axis extends perpendicularly from this plane toward the scene that is to be imaged. The choice of axes, however, is arbitrary and is made solely for the sake of convenience in describing embodiments of the invention.

As explained earlier, projection assembly 30 projects a patterned radiation field onto object 22 (in this case the hand of a user of the system) in a scene, and image capture assembly 32 captures an image of the scene onto which the pattern is projected. A controller 52 or other electronic processor processes the image in order to generate a depth map of object 22. This sort of mapping process is described in detail, for example, in U.S. Pat. Nos. 8,400,494 and 8,456,517, whose disclosures are incorporated herein by reference. The depth map of the user's hand (and/or other parts of the user's body) may be used in a gesture-based computer interface, but this sort of functionality is beyond the scope of the present patent application.

Image capture assembly 32 comprises objective optics 48, which form an optical image of the scene containing object 22 on an image sensor 50, such as a CMOS integrated circuit image sensor. The image sensor comprises an array of sensor elements, arranged in multiple rows and columns. The sensor elements generate respective signals in response to the radiation focused onto them by optics 48, wherein the pixel value of each pixel in the electronic images output by image sensor 50 corresponds to the signal from a respective sensor element.

Projection assembly 30 comprises a beam generation module 40, which generates a beam of patterned light, and projection optics 46, which project the beam onto the scene. In one embodiment, module 40 comprises a radiation source 42, such as a laser diode or an array of laser diodes, which emits light toward a DOE 44, which is designed to generate the desired structured light pattern. DOE-based projectors of this sort are described, for example, in U.S. Patent Application Publication 2010/0284082, whose disclosure is incorporated herein by reference. The term "light," in the context of the present description and in the claims, may comprise any or all of visible, infrared, and ultraviolet optical radiation.

In some embodiments, DOE 44 generates an uncorrelated pattern of spots, which projection optics 46 project onto the scene. In the context of the present patent application, the term "uncorrelated pattern" refers to a projected pattern of spots (which may be bright or dark), whose positions are uncorrelated in planes transverse to the projection beam axis. The positions are uncorrelated in the sense that the auto-correlation of the pattern as a function of transverse shift is insignificant for any shift larger than the spot size and no greater than the maximum shift that may occur over the range of depths mapped by the system. Random and pseudo-random patterns are uncorrelated in this sense. Synthetic patterns, created by human or computer design, such as quasi-periodic patterns, may also be uncorrelated to the extent specified by the above definition. Alternatively, as noted earlier, projection assembly 30 and DOE 44 may be used to project patterns of other sorts, not necessarily uncorrelated.

Figure 3:
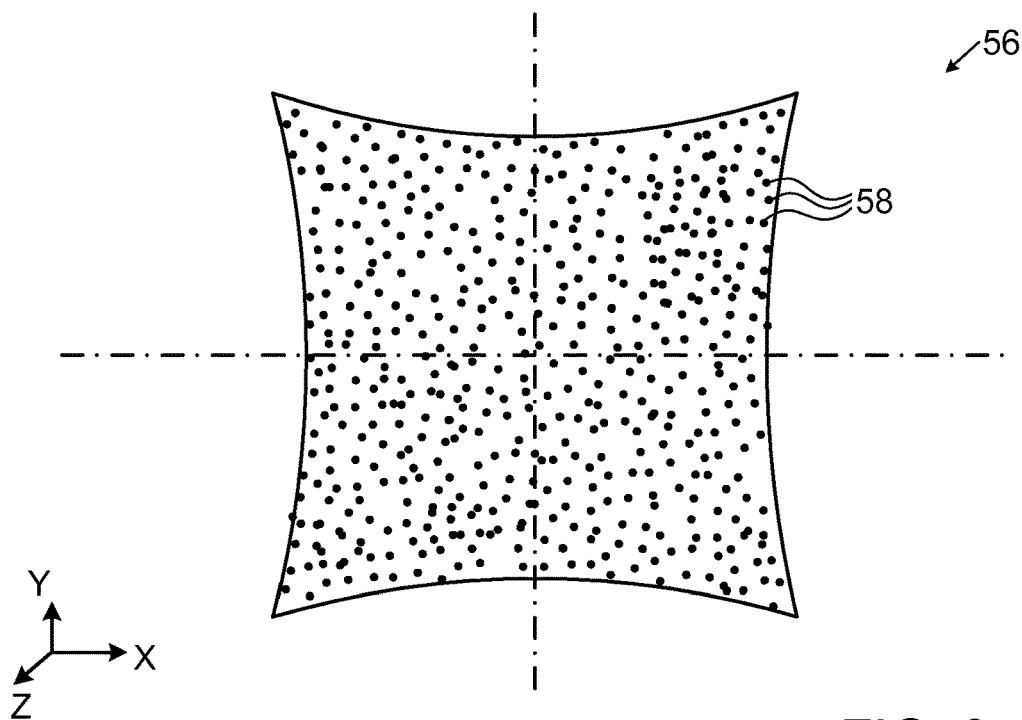
FIG. 3 is a schematic frontal view of a projected pattern, in accordance with an embodiment of the invention.

FIG. 3 is a schematic frontal view of a pattern 56 that is projected onto a scene by projection assembly 30, in accordance with an embodiment of the present invention.

In this example, pattern 56 comprises a predefined distribution of light spots 58 on a dark background (with light and dark reversed in the figure for clarity of representation). DOE 44 is typically designed to give an approximately uniform density of spots over pattern 56. A failure of the DOE, on the other hand, will lead to a partial or total loss of intensity of spots 58 in some or all regions of pattern 56. The intensity that is lost from the spot pattern may be concentrated in an intense zero-order beam, which passes through DOE 44 without diffraction.

Controller 52 correlates the respective locations of spots 58 as they appear in the image of the scene that is captured by image capture assembly 32 with the corresponding spots in a reference image of pattern 56. The local shifts of the spots are indicative of the depth coordinates, as explained above, and thus define the local depth values that go into the depth map. The respective depth value of each pixel in the depth map, in other words, corresponds to the shift of spots 58 in the vicinity of the pixel.

Typically, controller 52 calculates the shift value for each pixel by means of a correlation computation between the local pattern in each area of the captured image and candidate areas of the reference image. The local shift vector of the captured image relative to the reference image that gives the highest correlation is taken to be the shift value for that pixel. Additionally or alternatively, other factors may be taken into account in the computation. The controller may associate a confidence level with each shift value that it computes, given by the magnitude of the correlation. If the computation fails to produce a shift value at a given pixel, or if the confidence level of the shift value is below a predefined threshold, controller 52 assigns a default depth value to the pixel, indicating that the depth computation at that pixel returned an invalid result.

When DOE 44 fails, spots 58 will typically lose intensity, as explained above, or otherwise change so that controller 52 will be unable to correlate them with the reference image. In consequence, the depth map will contain no valid depth values at the locations of these spots, or possible no valid depth values at all.

Figure 4:
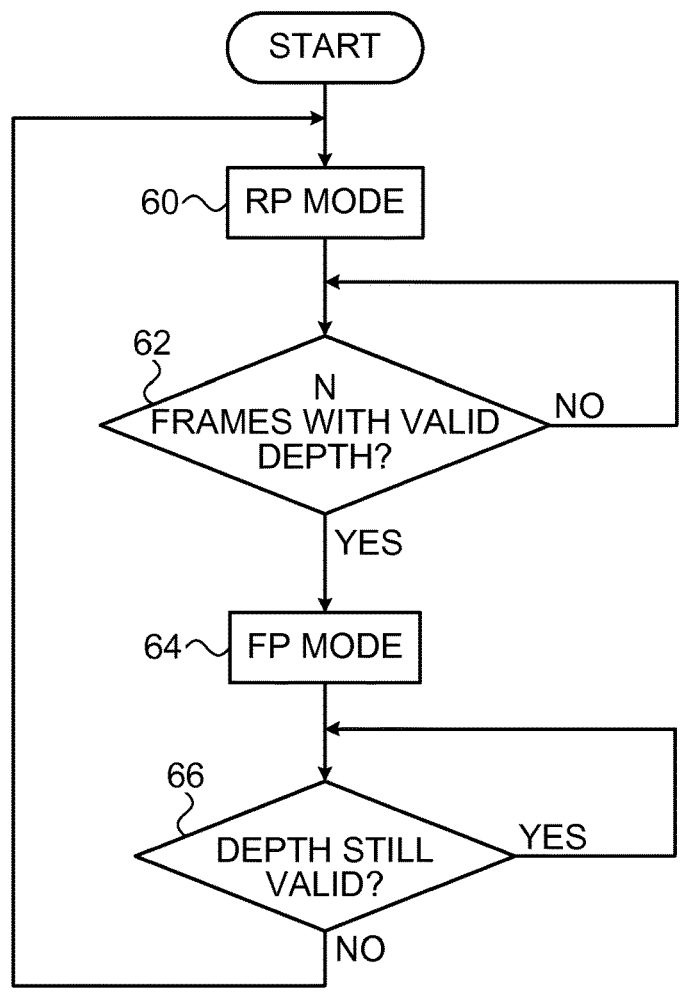
FIG. 4 is a flow chart that schematically illustrates a method for controlling the intensity of a projected pattern, in accordance with an embodiment of the invention.

FIG. 4 is a flow chart that schematically illustrates a method for controlling the intensity of the pattern projected by projection assembly 30, in accordance with an embodiment of the invention. This method is described here, for the sake of concreteness and clarity, with reference to the specific elements of device 24. Alternatively, the principles of the method may similarly be applied in substantially any depth mapping system using projected structured light.

Upon startup, device 24 begins operation in a reduced power (RP) mode, at a low-intensity operation step 60. Operating in this manner is advantageous in that it enables the device to verify that projection assembly 30 is working properly before increasing to full intensity. The average projection intensity may be reduced simply by operating radiation source 42 continuously at a fixed, reduced power level. As noted earlier, however, it can be advantageous to reduce the average intensity by operating radiation source 42 with a reduced duty cycle relative to full-power operation, in which the radiation source typically operates at or near 100% duty cycle. For example, the duty cycle may be reduced in step 60 to 10% by turning radiation source 42 on only during one in every ten image frames (wherein each frame typically takes $\frac{1}{30}$ sec at a standard video rate) captured by image capture assembly 32. During the periods that the radiation source is turned on, it may be driven either at the same instantaneous intensity as during full-power mode or at a reduced instantaneous intensity. Substantially any duty cycle may be used during step 60 as long as it brings the time-averaged intensity below whatever safe operation threshold is applicable in the event of failure of DOE 44.

During each frame in which radiation source 42 operates in low-power mode, imaging subassembly 32 captures an image of the pattern projected onto the scene, and controller 52 processes the image to extract a depth map of the scene. A processor (such as controller 52 itself or an external processor, such as processor 26) evaluates the depth map in order to determine whether it meets certain predefined validity conditions, at a validity assessment step 62. Details of a possible implementation of this step are described hereinbelow with reference to FIG. 5. Failure to meet the validity conditions at step 62 can be indicative of a fault in projection of the pattern by projection assembly 30.

The processor evaluates a certain number, N, of successive frames in this manner at step 62. N may be set to any suitable value greater than or equal to one. It is desirable that N=2 or more, in order to ensure that the assessment of validity is confirmed and avoid false positive results, in which the projection subassembly is erroneously considered to be working properly. (Proper setting of the thresholds and evaluation conditions should also minimize false negative results, due to which projection subassembly 30 is unnecessarily kept in reduced-power mode.) Once the processor has counted N successive frames with valid depth maps, it switches projection assembly 30 to full-power (FP) mode, at a full-intensity operation step 64.

While device 24 operates in full-power mode, the processor evaluates the depth maps generated by the device, at a validity checking step 66. The processor may either evaluate all depth maps or may perform the evaluation intermittently. As long as the validity conditions continue to be satisfied in every frame captured by imaging subassembly 32, device 24 remains in full-power mode. Upon detecting a possible fault condition in a depth map, however, the processor returns projection assembly 30 to reduced-power operation, at step 60. The cycle of operation then continues as described above.

Figure 5:
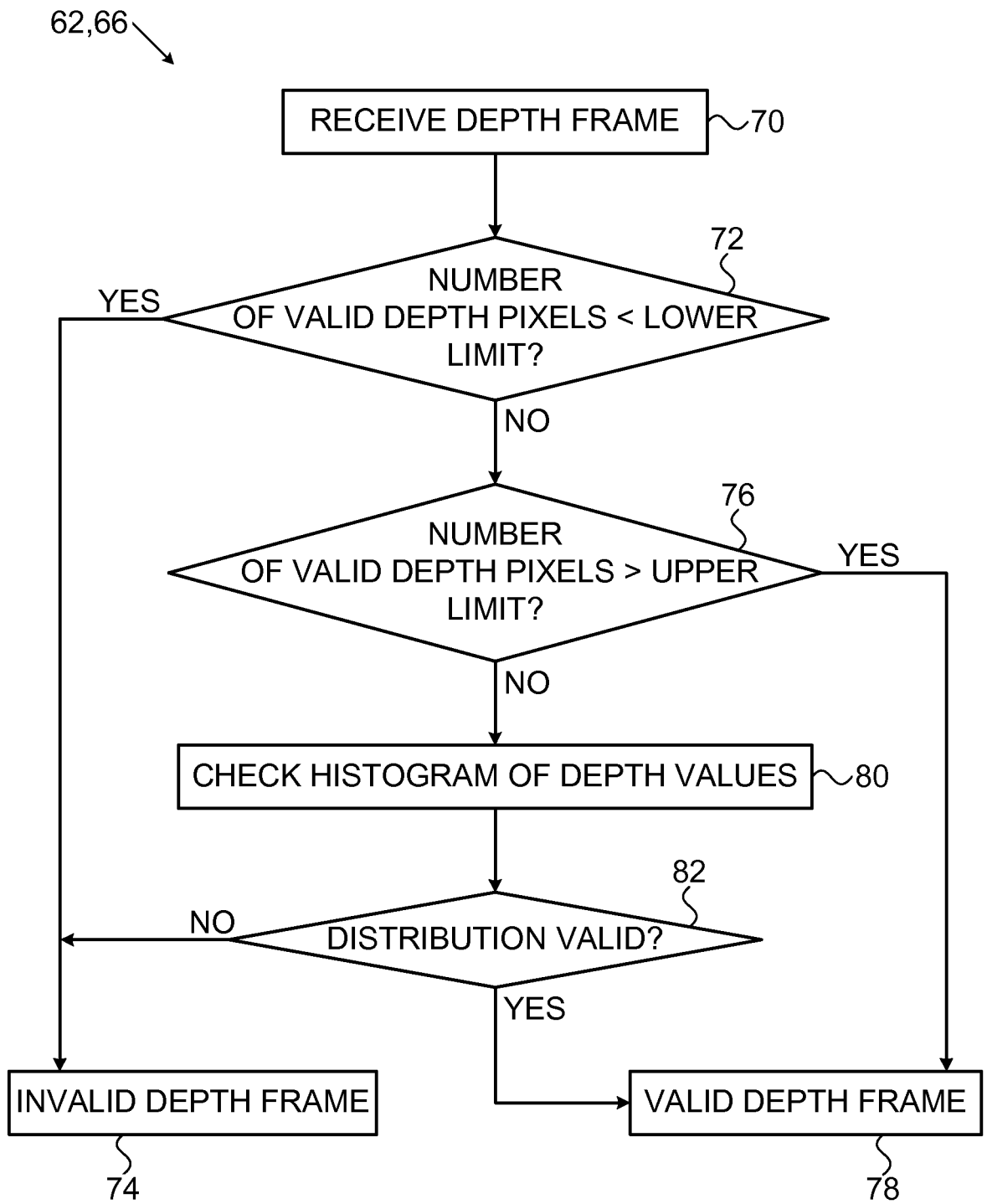
FIG. 5 is a flow chart that schematically illustrates a method for evaluating validity of a depth map, in accordance with an embodiment of the invention.

FIG. 5 is a flow chart that schematically shows details of a method that can be carried out at steps 62 and 66 for evaluating validity of a depth map, in accordance with an embodiment of the invention. This figure presents one possible algorithm for this purpose, which combines checking the number of the pixels having valid depth values against certain predefined limits and checking that the distribution of the depth values satisfies certain validity criteria. Alternatively, the processor may check only the number of valid pixels, or may apply different criteria in checking the distribution of depth values. For example, if controller 52 reports not only the depth values of the pixels in the depth map, but also confidence levels associated with the depth computation, these confidence levels may be taken into account in the validity assessment. All such alternative methods of validity evaluation are considered to be within the scope of the present invention.

The processor evaluating the depth maps, such as controller 52 or processor 26, receives a depth map for evaluation, at a frame input step 70. The processor counts the number of pixels in the depth map that have valid depth values, at a pixel number checking step 72. If the number of pixels with valid depth values in the depth map is below a predefined lower limit, the processor flags the image frame as invalid, at an invalidity detection step 74. In this case, device 24 will switch to or remain in the reduced-power mode (step 60 in FIG. 4). Typically, the lower limit applied at step 72 corresponds to a few percent or less of the total number of pixels in the depth map.

As long as the number of pixels with valid depth values is above the lower limit, the processor checks whether the number of pixels with valid depth values is greater than a predefined upper limit, at a number validity checking step 76. This upper limit depends on system configuration, and typically corresponds, for example, to at least ten percent, or possibly as many as half, of the total number of pixels in the depth map. If the number of valid depth pixels is above the upper limit, the processor flags the image frame as valid, at a validity detection step 78.

If the number of pixels with valid depth values is in the intermediate range, between the upper and lower limits, the processor checks the distribution of the depth values of the pixels. Various statistical approaches may be used at this step, such as checking a histogram of the depth value, at a histogram evaluation step 80. Valid depth maps are typically characterized by a large number of pixels having the same or similar depth values, since an object in the depth map will typically occupy a large area, and the depths of the pixels in this area will be clustered in a small range. The depth histogram in this case will be characterized by strong peaks in a small number of bins or groups of neighboring bins. On the other hand, depth maps in which the histogram contains only a single peak or no strong peaks at all can be indicative of fault conditions.

Additionally or alternatively, at step 80 the processor can examine various statistics over the distribution of the confidence scores. As a specific example, the processor may calculate and evaluate a histogram of the confidence scores. Under fault conditions, the confidence scores tend to be lower, with few samples populating the higher bins of the confidence histogram. One way to take advantage of this fact is to test whether the confidence histogram counts in the higher bins are lower than some configurable threshold. This sort of distribution is likely to be indicative of fault conditions.

Based on the above or other sorts of considerations, the processor decides whether or not the distribution of depth values is indicative of a valid depth map, at a distribution check step 82. Alternatively or additionally, other statistical and/or morphological tests may be applied to the depth map. On this basis, the processor flags the frame either as valid at step 78, or invalid at step 74. Depending on the results, the processor decides whether to continue operation in either reduced-power or full-power mode, as explained above It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for projection, comprising:
projecting a pattern of structured light with a given average power onto a scene;
capturing a sequence of images of the scene while projecting the pattern;
processing at least one captured image in the sequence in order to extract a depth map of the scene, the depth map comprising an array of pixels with respective depth values;
identifying that the depth map indicates a fault in projection of the pattern; and
responsively to identifying that the depth map indicates the fault, reducing the average power of the projection of the pattern.

2. The method according to claim 1, wherein projecting the pattern comprises generating the pattern by directing a laser beam to impinge on a diffractive optical element (DOE), and wherein identifying that the depth map indicates the fault comprises identifying that the depth map indicates a failure of the DOE.

3. The method according to claim 1, wherein identifying that the depth map indicates the fault comprises detecting that a number of the pixels having valid depth values is below a predefined limit.

4. The method according to claim 1, wherein identifying that the depth map indicates the fault comprises detecting that a distribution of the depth values does not satisfy a predefined validity criterion.

5. The method according to claim 1, wherein processing the at least one captured image comprises computing confidence scores with respect to the depth values, and wherein identifying that the depth map indicates the fault comprises detecting that a distribution of the confidence scores does not satisfy a predefined validity criterion.

6. The method according to claim 1, wherein the at least one image captured while projecting the pattern with the given average power is a first image, and the depth map extracted therefrom is a first depth map, and
wherein the method comprises, after identifying that the first depth map indicates the fault:
capturing at least a second image while projecting the pattern at the reduced average power;
processing at least the second image in order to extract a second depth map;
making a determination, based on the second depth map, that the fault has been resolved; and
responsively to the determination, increasing the average power of the projection of the pattern.

7. The method according to claim 6, wherein reducing the average power comprises reducing a duty cycle of the projection of the pattern, and wherein increasing the average power comprises increasing the duty cycle.

8. The method according to claim 6, wherein processing at least the second image comprises extracting multiple depth maps from successive images captured while projecting the pattern at the reduced average power, and wherein making the determination comprises deciding that the fault has been resolved only after finding the fault to have been resolved based on a predefined number of the extracted depth maps.

9. Projection apparatus, comprising:
a projection assembly, which is configured to project a pattern of structured light with a given average power onto a scene;
an image capture assembly, which is configured to capture a sequence of images of the scene while the pattern is projected onto the scene; and
a processor, which is configured to process at least one captured image in the sequence in order to extract a depth map of the scene, the depth map comprising an array of pixels with respective depth values, to identify that the depth map indicates a fault in projection of the pattern, and responsively to identifying that the depth map indicates the fault, to cause the projection assembly to reduce the average power of the projection of the pattern.

10. The apparatus according to claim 9, wherein the projection assembly comprises a diffractive optical element (DOE) and a laser, which is configured to direct a laser beam to impinge on the DOE, and wherein the fault includes a failure of the DOE.

11. The apparatus according to claim 9, wherein the processor is configured to identify that the depth map indicates the fault by detecting that a number of the pixels having valid depth values is below a predefined limit.

12. The apparatus according to claim 9, wherein the processor is configured to identify that the depth map indicates the fault by detecting that a distribution of the depth values does not satisfy a predefined validity criterion.

13. The apparatus according to claim 9, wherein the processor is configured to compute confidence scores with respect to the depth values, and to identify that the depth map indicates the fault by detecting that a distribution of the confidence scores does not satisfy a predefined validity criterion.

14. The apparatus according to claim 9, wherein the at least one image captured while projecting the pattern with the given average power is a first image, and the depth map extracted therefrom is a first depth map, and
wherein the processor is configured, after identifying that the first depth map indicates the fault, to process at least a second image captured by the image capture assembly while the projection assembly projects the pattern at the reduced average power, to process at least the second image in order to extract a second depth map, to make a determination, based on the second depth map, that the fault has been resolved, and responsively to the determination, to cause the projection assembly to increase the average power of the projection of the pattern.

15. The apparatus according to claim 14, wherein the average power is reduced by reducing a duty cycle of the projection of the pattern, and the average power is increased by increasing the duty cycle.

16. The apparatus according to claim 14, wherein the processor is configured to extract multiple depth maps from successive images captured while projecting the pattern at the reduced average power, and to decide that the fault has been resolved only after finding the fault to have been resolved based on a predefined number of the extracted depth maps.

17. A computer software product, comprising a non-transitory, computer-readable medium in which program instructions are stored, which instructions, when read by a programmable processor, cause the processor to receive a sequence of images of a scene while a pattern of structured light is projected onto the scene with a given average power, to process at least one captured image in the sequence in order to extract a depth map of the scene, the depth map comprising an array of pixels with respective depth values, to identify that the depth map indicates a fault in projection of the pattern, and responsively to identifying that the depth map indicates the fault, to reduce the average power of the projection of the pattern.

18. The product according to claim 17, wherein the pattern is generated by directing a laser beam to impinge on a diffractive optical element (DOE), and wherein the fault includes a failure of the DOE.

19. The product according to claim 17, wherein the instructions cause the processor to identify that the depth map indicates the fault by detecting that a number of the pixels having valid depth values is below a predefined limit.

20. The product according to claim 17, wherein the instructions cause the processor to identify that the depth map indicates the fault by detecting that a distribution of the depth values does not satisfy a predefined validity criterion.

\* \* \* \* \*